United States Patent
Mohan et al.

(10) Patent No.: US 10,131,184 B2
(45) Date of Patent: Nov. 20, 2018

(54) RESONATOR DEVICE AND VEHICLE WHEEL ASSEMBLY INCLUDING THE SAME

(71) Applicant: FORD GLOBAL TECHNOLOGIES, LLC, Dearborn, MI (US)

(72) Inventors: James Mohan, Canton, MI (US); Christopher Pierce, Dearborn Heights, MI (US); David Scott Rohweder, Troy, MI (US)

(73) Assignee: Ford Global Technologies,LLC, Dearborn, MI (US)

( * ) Notice: Subject to any disclaimer, the term of this patent is extended or adjusted under 35 U.S.C. 154(b) by 238 days.

(21) Appl. No.: 14/471,206

(22) Filed: Aug. 28, 2014

(65) Prior Publication Data
US 2016/0059624 A1    Mar. 3, 2016

(51) Int. Cl.
| | |
|---|---|
| *B60B 25/22* | (2006.01) |
| *B60C 19/00* | (2006.01) |
| *B60B 21/12* | (2006.01) |
| *F01N 1/02* | (2006.01) |

(52) U.S. Cl.
CPC .............. *B60B 25/22* (2013.01); *B60B 21/12* (2013.01); *B60C 19/002* (2013.01); *B60B 2900/131* (2013.01); *B60B 2900/133* (2013.01); *F01N 1/023* (2013.01)

(58) Field of Classification Search
CPC ......... B60B 25/22; B60B 19/00; B60B 21/12; B60B 2900/131; B60B 2900/133; F01N 1/023; B60C 19/002
USPC ....................................... 152/381.6; 301/6.91
See application file for complete search history.

(56) References Cited

U.S. PATENT DOCUMENTS

| | | | |
|---|---|---|---|
| 6,309,026 B1 | 10/2001 | Svedhem et al. | |
| 6,516,849 B2* | 2/2003 | Flament | B60C 3/06 |
| | | | 152/381.5 |
| 6,935,024 B2* | 8/2005 | Shimizu | B21K 1/28 |
| | | | 29/894.35 |
| 7,013,940 B2* | 3/2006 | Tsihlas | B60C 19/002 |
| | | | 152/154.1 |
| 8,196,628 B2* | 6/2012 | Fowler-Hawkins | |
| | | | B60C 19/002 |
| | | | 152/339.1 |

(Continued)

FOREIGN PATENT DOCUMENTS

| | | | | |
|---|---|---|---|---|
| DE | 19801570 A1 | 7/1999 | | |
| EP | 0796747 A1 * | 9/1997 | ............. | B60C 17/06 |

(Continued)

OTHER PUBLICATIONS

Haran Periyathamby, Helmholtz Resonator for Reducing Tire Cavity Resonance and In-Vehicle Noise, vol. 32, No. 4, pp. 27-31, dated 2004.

*Primary Examiner* — Kip T Kotter
*Assistant Examiner* — Scott A Browne
(74) *Attorney, Agent, or Firm* — LeClairRyan

(57) ABSTRACT

In one or more embodiments, a resonator device includes a first chamber including a first leg portion extending in a longitudinal direction and a first shoulder extending in a transverse direction, and a second chamber positioned next to the first chamber at least partially along the longitudinal direction. The second chamber may include a second shoulder portion positioned next to the first leg portion and a second leg portion positioned next to the first shoulder portion.

17 Claims, 5 Drawing Sheets

(56) References Cited

U.S. PATENT DOCUMENTS

| | | | |
|---|---|---|---|
| 8,418,735 B2 | 4/2013 | Kamiyama et al. | |
| 8,490,665 B2 | 7/2013 | Nagata et al. | |
| 2001/0007268 A1* | 7/2001 | Yukawa | B60B 21/023 152/381.6 |
| 2009/0108666 A1* | 4/2009 | Kashiwai | B60B 3/04 301/95.104 |
| 2014/0346843 A1* | 11/2014 | Kamiyama | B60B 21/12 301/5.1 |
| 2015/0321509 A1* | 11/2015 | Kamiyama | B60B 21/12 301/95.101 |

FOREIGN PATENT DOCUMENTS

| | | |
|---|---|---|
| EP | 0936083 A2 | 8/1999 |
| EP | 1932689 A1 | 6/2008 |
| JP | 2012016973 A | 1/2012 |
| WO | 2013053436 A1 | 4/2013 |

\* cited by examiner

RESONATOR DEVICE AND VEHICLE WHEEL ASSEMBLY INCLUDING THE SAME

TECHNICAL FIELD

The present invention in one or more embodiments relates generally to a resonator device and a vehicle wheel assembly including the same.

BACKGROUND

Vibrations of a tire caused by roughness of a road surface lead to cavity noise. Cavity noise produced by tires has been a concern in the automotive industry.

SUMMARY

In one or more embodiments, a resonator device includes a first chamber including a first leg portion extending in a longitudinal direction and a first shoulder extending in a transverse direction, and a second chamber positioned next to the first chamber at least partially along the longitudinal direction. The second chamber may include a second shoulder portion positioned next to the first leg portion and a second leg portion positioned next to the first shoulder portion.

A cross-section of the resonator device along the transverse direction may include a section of the first leg portion and a section of the second leg portion. Another cross-section of the resonator device along the transverse direction may include a section of the first shoulder portion. Yet another cross-section of the resonator device along the transverse direction may include a section of the second shoulder portion. Yet another cross-section of the resonator device along the longitudinal direction may include a section of the first shoulder portion and a section of the second chamber.

The longitudinal direction may be perpendicular to the transverse direction plus or minus up to 30 degrees.

The first shoulder portion may differ from the second shoulder portion in cross-sectional dimension at least along one of the longitudinal direction and the transverse direction.

The first leg portion may differ from the second leg portion in maximum cross-sectional dimension at least along one of the longitudinal direction and the transverse direction.

In another or more embodiments, the present invention provides a vehicle wheel assembly which includes first and second disks, a rim positioned between the first and second disks, and a resonator device described herein elsewhere.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

Figure 1:
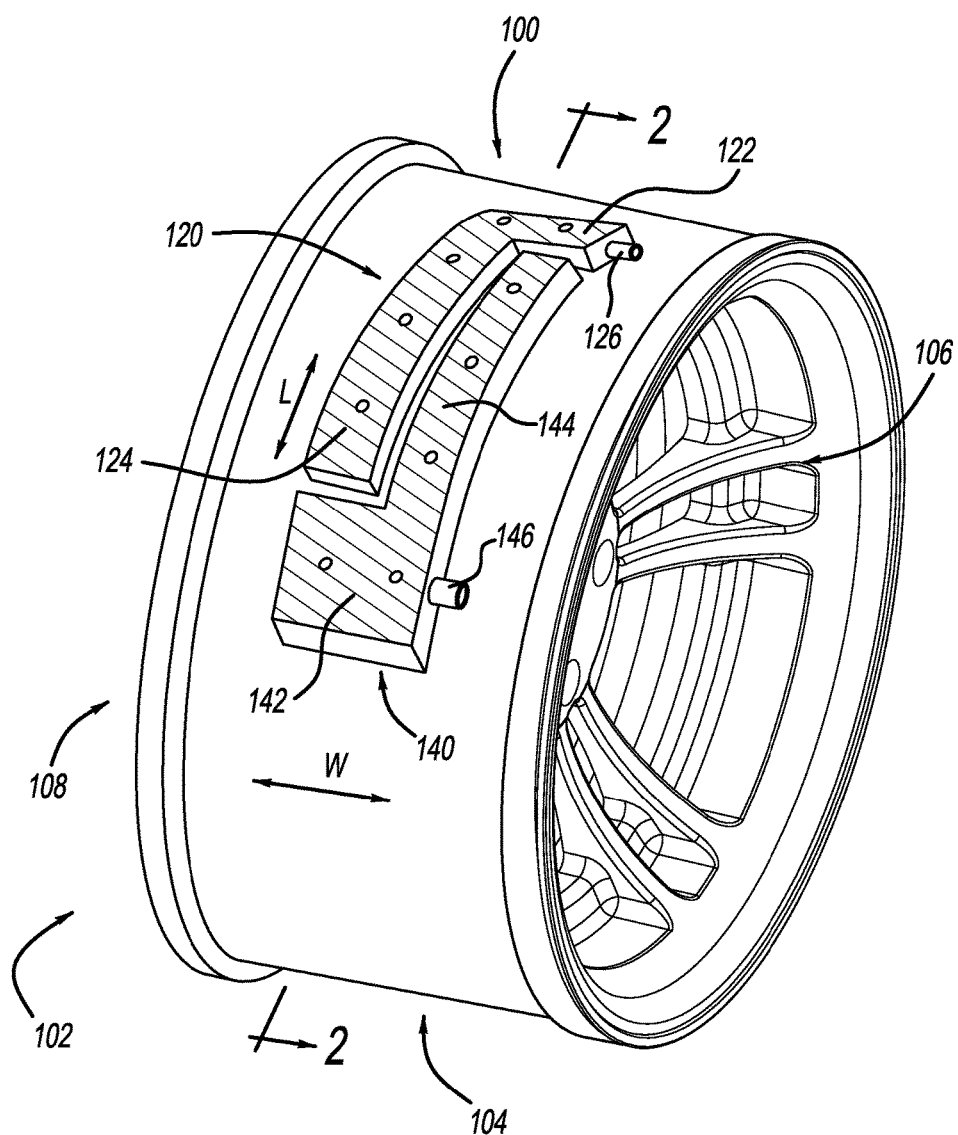
FIG. 1 illustratively depicts a vehicle wheel assembly including a resonator device according to one or more embodiments.

As referenced in the FIGS., the same reference numerals are used to refer to the same components. In the following description, various operating parameters and components are described for different constructed embodiments. These specific parameters and components are included as examples and are not meant to be limiting.

In one or more embodiments, the present invention is believed to be advantageous in at least providing a resonator device formed of first and second chambers which differ in frequency, wherein the frequency may be varied with an internal volume of each of the chambers. With the differing frequencies, the chambers are positioned to cancel out the predominate peaks of noise within the wheel and tire assembly to allow tuning to the frequencies needed to be canceled.

As detailed herein elsewhere, when designed as a single blow-moldable piece with two resonator volumes and two necks, the resonator device is believed to be positioned to maximize the available space within a tire cavity without impeding on the bead seat and without having to necessarily limit airflow to the necks.

As detailed herein elsewhere, the first and second chambers may be positioned in an interlocking position each via a generally "L" shape. Doubling the amount of resonator in the design allows for the reduction of noise over a large range of frequencies. Two "L" shaped resonators are built into one moldable part resulting in maximization of packaging area. Particularly also, the first and second chambers may share a common floor and be configured as a single blow-moldable device.

Figure 3A:
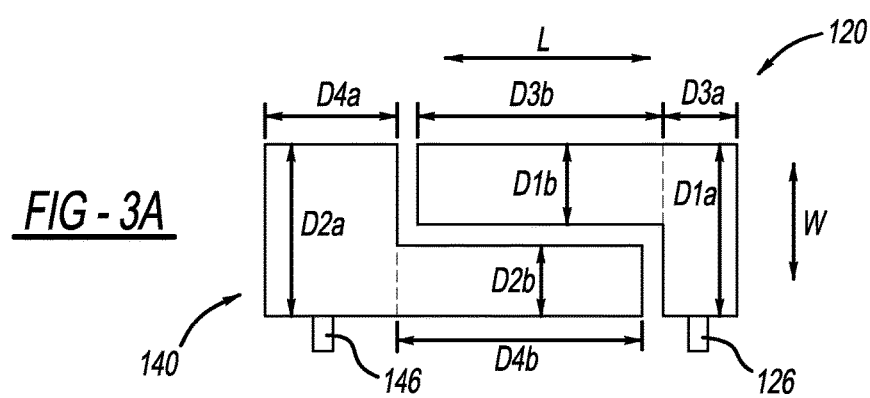
FIG. 3A illustratively depicts a top view of the resonator device referenced in FIG. 1.
Figure 4:
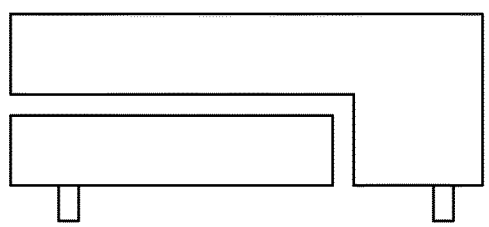
FIG. 4 illustratively depicts an alternative view of the resonator device referenced in FIG. 3A.

In one or more embodiments, and as illustratively depicted in FIG. 1 in view of FIG. 3A, a resonator device 100 is shown as positioned on an outer surface of a rim 104 of a vehicle wheel 102, wherein the rim 104 is positioned between disk 106 and disk 108. The resonator device 100 includes a first chamber 120 including a first leg portion 124 extending in a longitudinal direction "L" and a first shoulder portion 122 extending in a transverse direction "W", and a second chamber 140 positioned next to the first chamber 120 at least partially along the longitudinal direction "L".

As illustratively depicted in FIG. 3A in view of FIG. 1, the second chamber 140 may include a second shoulder portion 142 positioned next to the first leg portion 124 and a second leg portion 144 positioned next to the first shoulder portion 122. In certain embodiments, and as illustratively depicted in FIG. 3B, the second chamber 140 may only include the second leg portion 144 which is positioned in its entirety next to the first leg portion 124 of the first chamber 120 along the longitudinal axis "L."

Figure 2:
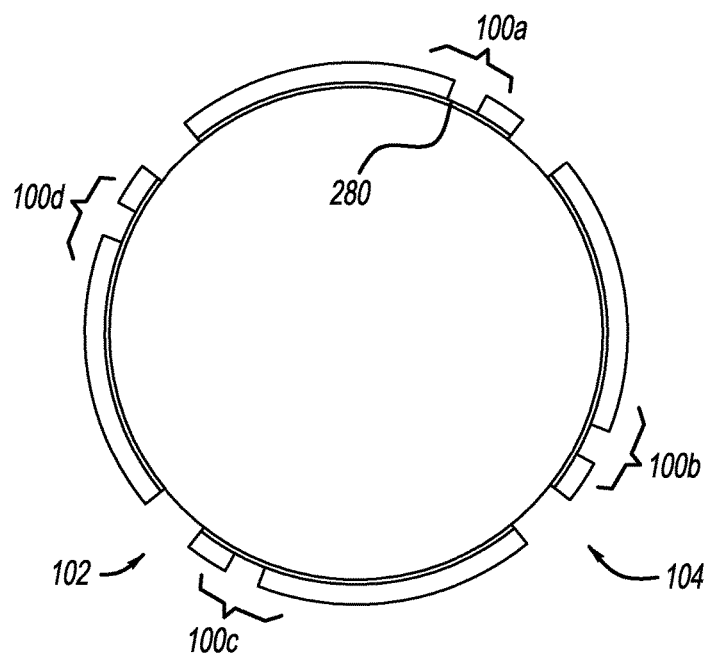
FIG. 2 illustratively depicts a longitudinal cross-section of the vehicle wheel assembly referenced in FIG. 1.
Figure 3B:
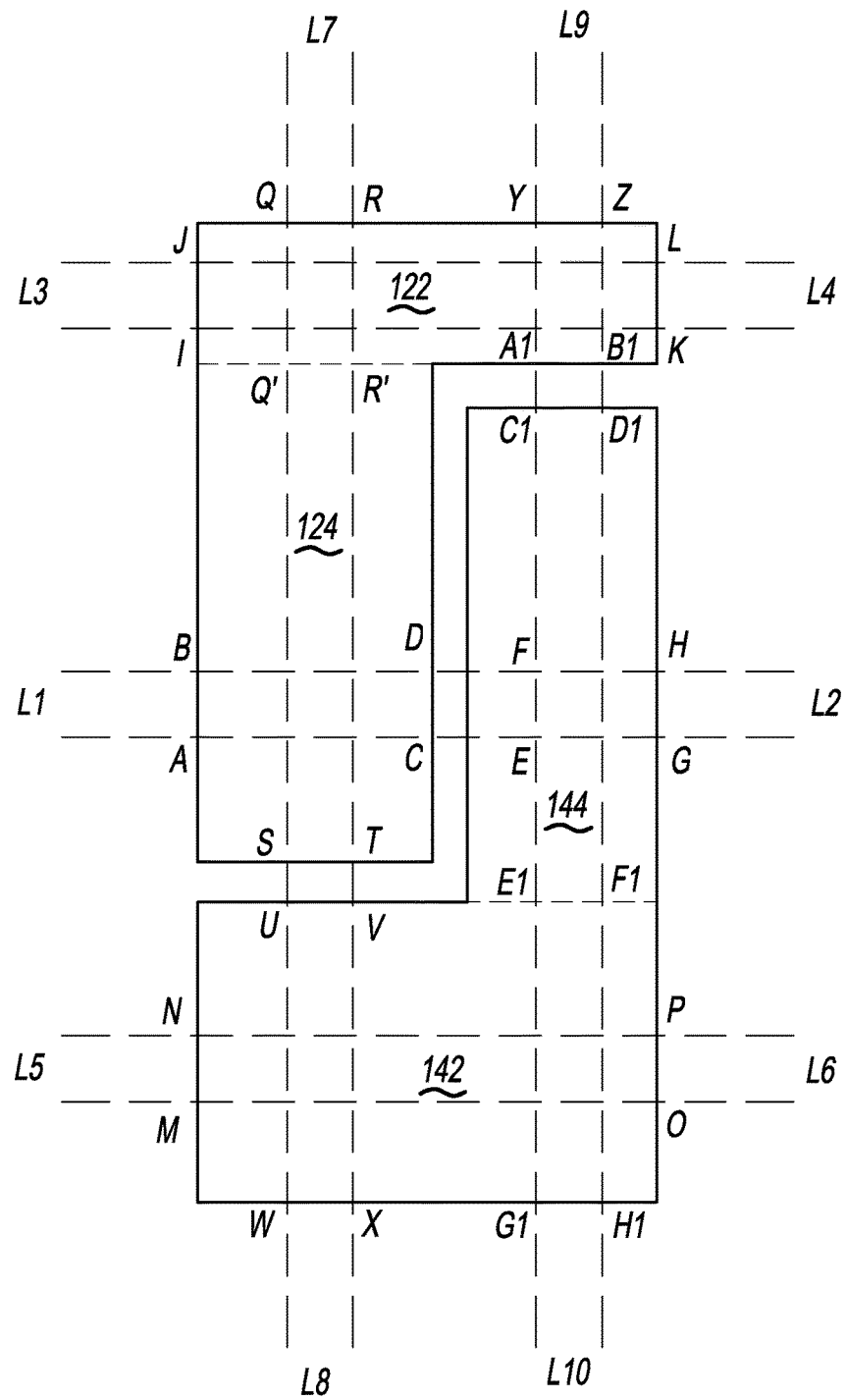
FIG. 3B illustratively depicts an enlarged view of the resonator device referenced in FIG. 3A.

Referring back to FIG. 1 in view of FIG. 3B, the resonator device 100 is structured such that a cross-section "ABGH" of the resonator device 100 taken via an area cut "L1-L2" along the transverse direction "W" includes a section "ABCD" of the first leg portion 124 and a section "EFGH" of the second leg portion 144. The section "ABCD" of the first leg portion 124 may be spaced apart from the section "EFGH" of the second leg portion 144, yet optionally connected via a common floor 280 as shown in FIG. 2 and detailed herein elsewhere.

Referring back to FIG. 1 in view of FIG. 3B, the resonator device 100 is structured such that a cross-section "IJKL" of the resonator device 100 taken via an area cut "L3-L4" along the transverse direction "W" includes a section "IJKL" of the first chamber 120, or of the first shoulder portion 122 of the first chamber 120 in particular and nothing from the second chamber 140. The area cut "L3-L4" is taken at a distance from the area cut "L1-L2."

Referring back to FIG. 1 in view of FIG. 3B, the resonator device 100 is structured such that a cross-section "MNOP" of the resonator device 100 taken via an area cut "L5-L6" along the transverse direction "W" includes a section "MNOP" of the second chamber 140, or the second shoulder 142 of the second chamber 140 in particular, and nothing from the first chamber 120. The area cut "L5-L6" is taken at a distance from the area cut "L1-L2."

Optionally and as illustratively depicted in FIG. 1 in view of FIG. 3B, the area cut "L1-L2" may be taken at a location between the cross-sectional cuts "L3-L4" and "L5-L6."

Referring back to FIG. 1 and in view of FIG. 3B, the resonator device 100 is structured such that a cross-section "QRWX" of the resonator device 100 taken via an area cut "L7-L8" along the longitudinal direction "L" includes a section "QRQ'R'" of the first shoulder portion 122, a section "Q'R'ST" of the first leg portion 124, and a section "UVWX" of the second shoulder portion 142. The section "Q'R'ST" of the first leg portion 124 may be spaced apart from the section "UVWX" of the second shoulder portion 142, yet optionally connected via a common floor 280 as shown in FIG. 2 and detailed herein elsewhere. In comparison, the section "Q'R'QR" may be in material continuity with the section "Q'R'ST" such that the two sections are essentially inseparable parts of the first chamber 120 as a molded article.

Referring back to FIG. 1 in view of FIG. 3B, the resonator device 100 is so structured such that a cross-section "YZG1H1" of the resonator device 100 taken via an area cut "L9-L10" along the longitudinal direction "L" includes a section "YZA1B1'" of the first shoulder portion 122, a section "C1D1E1F1" of the section leg portion 144, and a section "E1F1G1H1" of the second shoulder portion 142. The section "C1D1E1F1" of the second leg portion 144 may be spaced apart from the section "YZA1B1" of the first shoulder portion 122, yet optionally connected via a common floor 280 as shown in FIG. 2 and detailed herein elsewhere. In comparison, the section "C1D1E1F1" may be in material continuity with the section "E1F1G1H1" such that the two sections are essentially inseparable parts of the second chamber 140 as a molded article.

In certain embodiments, the longitudinal direction "L" is perpendicular to the transverse direction "W" plus or minus up to 30 degrees, 25 degrees, 15 degrees, 10 degrees or 5 degrees.

Referring back to FIG. 3A in view of FIG. 1, the first shoulder portion 122 has a cross-sectional dimension or in particular a maximum cross-sectional dimension "D1$a$" and the first leg portion 124 has a cross-sectional dimension or in particular a maximum cross-sectional dimension "D1$b$" along the transverse direction "W." The second shoulder portion 142 has a cross-sectional dimension or in particular a maximum cross-sectional dimension "D2$a$" and the second leg portion 144 has a cross-sectional dimension or in particular a maximum cross-sectional dimension "D2$b$" along the transverse direction "W." The value for "D1$a$" may be the same to or differ from the value for "D2$a$." The value for "D1$b$" may be the same to or differ from the value for "D2$b$." The value for "D1$a$" may be the same to or differ from the value for "D1$b$." The value for "D2$a$" may be the same to or differ from the value for "D2$b$."

Referring back to FIG. 3A in view of FIG. 1, the first shoulder portion 122 has a cross-sectional dimension or in particular a maximum cross-sectional dimension "D3$a$" and the first leg portion 124 has a cross-sectional dimension or in particular a maximum cross-sectional dimension "D3$b$" along the longitudinal direction "L." The second shoulder portion 142 has a cross-sectional dimension or in particular a maximum cross-sectional dimension "D4$a$" and the second leg portion 144 has a cross-sectional dimension or in particular a maximum cross-sectional dimension "D4$b$" along the longitudinal direction "L." The value for "D3$a$" may be the same to or differ from the value for "D4$a$." The value for "D3$b$" may be the same to or differ from the value for "D4$b$." The value for "D3$a$" may be the same to or differ from the value for "D3$b$." The value for "D4$a$" may be the same to or differ from the value for "D4$b$."

In addition to variations to the cross-sectional dimensions stated herein elsewhere, the first and second chambers 120, 140 may further be varied on one or more dimensions such that the first and second chambers 120, 140 differ in internal volume. Internal volume may be determined based on the maximum weight or the volume of atmospheric air that can be contained within each of the chambers or a portion thereof. Without wanting to be limited to any particular theory, it is believed that internal volume relates to sound frequencies; therefore the first and second chambers 120, 140 with different internal volumes offer different sound-damping capacities and hence cancellation of certain competing sound frequencies. Without wanting to be limited to any particular theory, it is believed that frequencies may be determined based on several parameters including the internal volumes, the neck diameters and the neck lengths. Optionally, varying the internal volumes while having the neck dimensions kept at the same may help control and vary both the frequencies and amplitudes between the two chambers.

To deliver the differential sound-damping capacities, the first and second chambers 120, 140 may differ in their respective internal volume by having differential internal volumes in the first and second shoulder portions 122, 142, respectively. Alternatively, internal volumes of the first and second leg portions 124, 144 may differ from each other to result in an overall difference in internal volume for the first and second chambers 120, 140. Without wanting to be limited to any particular theory, it is believed that a reason for changing one shoulder or leg portion over another is to keep the size of the part within certain boundaries established by the bead seat, and discs of the wheel assembly as well as to control both frequencies independent of one another.

Referring back to FIG. 1, the first shoulder portion 122 includes a first outlet neck 126 and the second chamber 140 includes a second outlet neck 146, wherein the first and second outlet necks 126, 146 are both positioned toward disk 106 as opposed to disk 108. In practice, the first and second outlet necks 126, 146 are the conduits via which atmospheric air becomes in communication with the chambers 120, 140 so as to effect noise cancellation. Without wanting to be limited to any particular theory, it is believed that air movement over across the open area of the necks 126, 146 creates an oscillation of the air column within the necks 126, 146, the frequency at which the oscillation occurs being defined by the air contained in the chambers 120, 140 in view of respective lengths and open diameters of the necks 126, 146.

The resonator device 100 as supported on the rim 104 may include any suitable pair number of the first and second chambers 120, 140. In certain embodiments, and as illustratively depicted in FIG. 3, four pairs 100a, 100b, 100c and 100d of the first and second chambers 120, 140 are supported on the rim 104.

For each of the chamber sets 100a, 100b, 100c and 100d of the resonator device 100 depicted in FIG. 2, the first and second chambers 120, 140 may be separately formed and thereafter deposited onto a common floor 280 illustratively depicted in FIG. 2, or a separate floor (not shown) for each. In this configuration, the common floor 280 does not contact the air contained within the first or the second chambers 120, 140. Alternatively, the common floor 280 becomes a wall for the first or the second chamber 120, 140 such that the common floor 280 contacts the air contained within the first or second chamber 120, 140. Without wanting to be limited to any particular theory, it is believed that having the common floor may be beneficial in reducing process variation, simplifying manufacturing process and enhancing efficiency in whole wheel assembly. Separate floors may be used in certain circumstances; however employing separate floors may introduce unnecessary process variations and lack of ease in parts assembly. In the event that the first and second chambers 120, 140 share a common floor, the entire resonator device 100 may be produced with one-step or one-shot molding using one or more suitable polymers. Without wanting to be limited to any particular theory, it is believed that using a one-step process instead of molding the two parts separately followed by a subsequent joining step reduces process variations particularly when polymers are used in the molding process.

EXAMPLE

In this example, test wheels including a control wheel and a sample wheel are employed, wherein the sample wheel includes a resonator device such as the resonator device 100 constructed according to FIG. 1, and the control wheel does not have the resonators. Waterfall charts are created on a high speed uniformity machine (HSU) with the test wheels running the coast down test. Amplitudes of noise over a frequency range are measured. The open circles indicate areas of relatively high noise, wherein the larger the circles, the higher the noise.

Structure born noise happens usually at a frequency range of 180 hz to 240 hz and more particularly at between the 200 and 220 hz range.

Figure 5A:
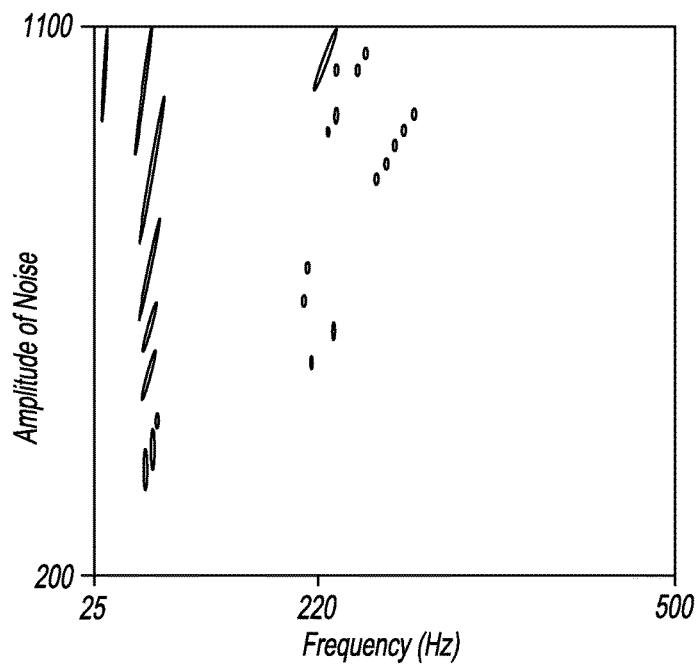
FIG. 5A and FIG. 5B illustratively depict noise amplitude over a frequency range for a control wheel and a sample wheel, respectively, according to one or more examples.
Figure 5B:
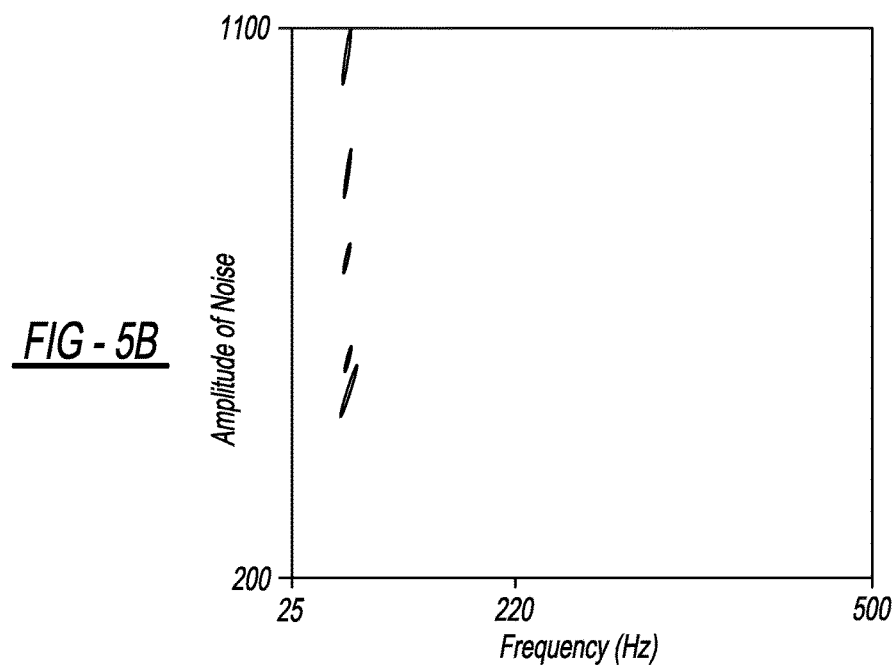

FIG. 5A illustratively depicts the noise profile of the control wheel and FIG. 5B illustratively depicts the noise profile of the sample wheel. As can be seen from FIG. 5B in view of FIG. 5A, both the extent and the amplitude of the noise at or around the frequency of 217 Hz are visibly reduced in the sample wheel relative to the control wheel.

Figure 6:
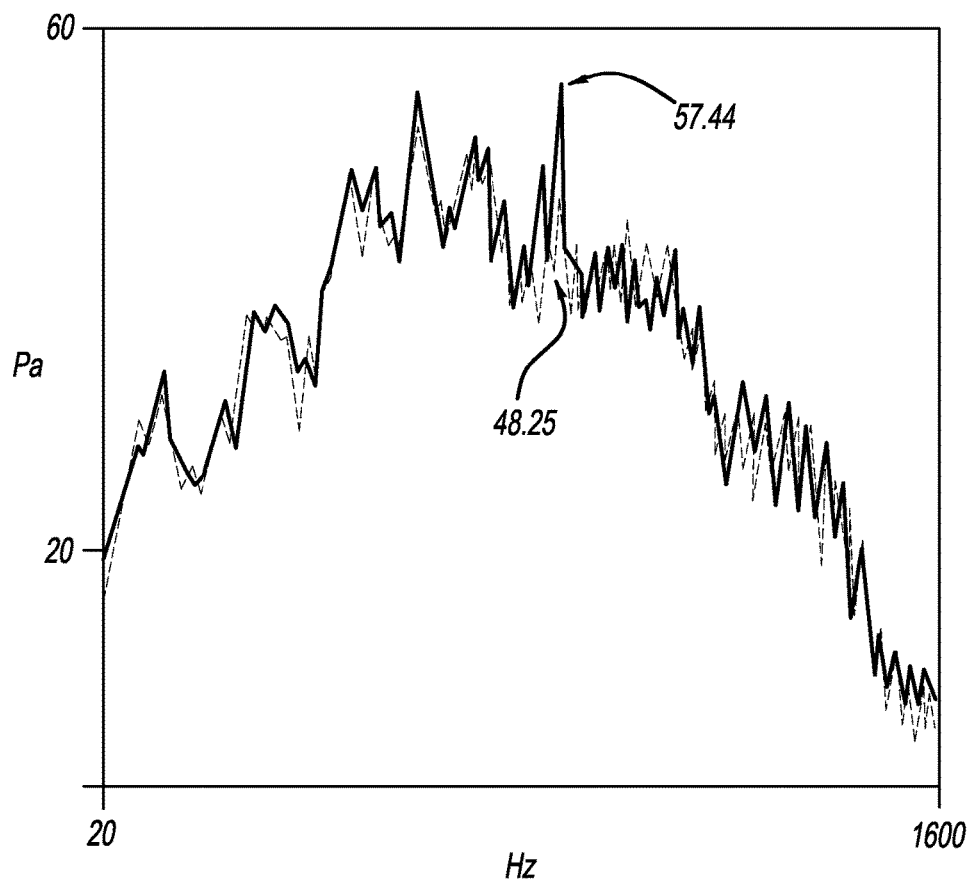
FIG. 6 illustratively depicts noise amplitude over a frequency range for a control and a sample wheel according to another or more examples.

As shown in FIG. 6, the solid line indicates results from the control wheel without the resonators. The broken line indicates results from the sample wheel with the resonators. A difference of about 9.2 decibels is observed between the control and the sample wheels at the 217 Hz, which are shown with 57.44 decibels and 48.25 decibels, respectively. This means that the sample wheel with the four resonator pairs is able to reduce the structure born noise by 9.2 decibels at the targeted frequency.

In one or more embodiments, the present invention is set forth herein in relation to a resonator device and a vehicle wheel assembly including the same. One skilled in the art will readily recognize from such discussion, and from the accompanying drawings and claims that various changes, modifications and variations can be made therein without departing from the true spirit and fair scope of the invention as defined by the following claims.

What is claimed is:

1. A resonator device, comprising:
   a first chamber including a side wall and a top wall, the side wall and the top wall defining a first internal volume, the first chamber including a first-leg-portion and a first-shoulder-portion connected thereto, the first-leg-portion including a first-leg-width extending in a transverse-direction and a first-leg-length greater than the first-leg-width and extending in a longitudinal-direction, the first-shoulder-portion including a first-shoulder-length extending in the transverse-direction and a first-shoulder-width shorter than the first-shoulder-length and extending in the longitudinal-direction, the first internal volume formed within the first-leg portion and the first-shoulder-portion; and
   a second chamber including a side wall and a top wall, the side wall and the top wall defining a second internal volume, the second chamber including a second-leg-portion and a second-shoulder-portion connected thereto, the second-shoulder-portion including a second-leg-width extending in the transverse-direction and a second-leg-length greater than the second-leg-width and extending in the longitudinal-direction, the second-shoulder-portion including a second-shoulder-length extending in the transverse-direction and a second-shoulder-width shorter than the second-shoulder-length and extending in the longitudinal-direction, the second internal volume formed within the second-leg-portion and the second-shoulder-portion, and
   wherein the first and the second chambers are positioned laterally offset and spaced apart from one another,
   wherein a first cross-section of the resonator device along the longitudinal-direction includes a section of the first-leg-portion and a section of the second-shoulder-portion, and wherein a second cross-section of the resonator device along the longitudinal-direction includes a section of the first-shoulder-portion and a section of the second-leg-portion, the second cross-section being spaced apart from the first cross-section along the transverse-direction.

2. The resonator device of claim 1, further comprising:
   a first outlet neck extending from the first chamber and in fluid communication therewith, and a second outlet neck extending in the same direction as the first outlet neck from the second chamber and in fluid communication.

3. The resonator device of claim 1, wherein the first and second internal volumes are different.

4. The resonator device of claim 1, further comprising:
   a common floor to support the first and second chambers.

5. The resonator device of claim 4, wherein the common floor and at least one of the first and second chambers each include a moldable polymer.

6. A resonator device, comprising:
a first chamber including a side wall and a top wall, the side wall and the top wall defining a first internal volume, the first chamber including a first-leg-portion and a first-shoulder-portion connected thereto, the first-leg-portion including a first-leg-width extending in a transverse-direction and a first-leg-length greater than the first-leg-width and extending in a longitudinal-direction, the first-shoulder-portion including a first-shoulder-length extending in the transverse-direction and a first-shoulder-width shorter than the first-shoulder-length and extending in the longitudinal-direction, the first internal volume formed within the first-leg portion and the first-shoulder-portion, and
a second chamber including a side wall and a top wall, the side wall and the top wall defining a second internal volume, the second chamber including a second-leg-portion, the second internal volume formed within the second-leg-portion,
wherein a cross-section of the resonator device along the longitudinal-direction includes a section of the first-shoulder-portion and a section of the second-leg-portion,
wherein the first and the second chambers are positioned laterally offset from one another and a gap is provided therebetween.

7. The resonator device of claim 6, wherein the resonator device further includes a first outlet neck extending from the first chamber and in fluid communication therewith and a second outlet neck extending from the second chamber and in fluid communication therewith, the first and second outlet necks each with an opening facing the same direction.

8. The resonator device of claim 6, wherein the second chamber includes a second-shoulder-portion connected to the second-leg-portion, the second-leg-portion including a second-leg-width extending in the transverse-direction and a second-leg-length greater than the second-leg-width and extending in the longitudinal-direction, the second-shoulder-portion including a second-shoulder-length extending in the transverse-direction and a second-shoulder-width shorter than the second-shoulder-length and extending in the longitudinal-direction, the second internal volume formed within the second-shoulder-portion.

9. The resonator device of claim 1, wherein the first-leg-width extending in the transverse-direction is at an angle of 60 to 120 degrees to a first-leg-length direction.

10. The resonator device of claim 1, wherein the first-leg-width extending in the transverse-direction is at an angle of 85 to 95 degrees to a first-leg-length direction.

11. The resonator device of claim 6, wherein the first-leg-width extending in the transverse-direction is at an angle of 60 to 120 degrees to a first-leg-length direction.

12. A resonator device, comprising:
a first chamber including a side wall and a top wall, the side wall and the top wall defining a first internal volume, the first chamber including a first-leg-portion and a first-shoulder-portion connected thereto, the first-leg-portion including a first-leg-width extending in a transverse-direction and a first-leg-length greater than the first-leg-width and first-leg-width extending in a longitudinal-direction at an angle of 60 to 120 degrees to a first-leg-length direction, the first-shoulder-portion including a first-shoulder-length extending in the transverse-direction and a first-shoulder-width shorter than the first-shoulder-length and extending in the longitudinal-direction, the first internal volume formed within the first-leg portion and the first-shoulder-portion;
a second chamber including a side wall and a top wall, the side wall and the top wall defining a second internal volume, the second chamber including a second-leg-portion and a second-shoulder-portion connected thereto, the second-leg-portion including a second-leg-width extending in the transverse-direction and a second-leg-length greater than the second-leg-width and extending in the longitudinal-direction, the second-shoulder-portion including a second-shoulder-length extending in the transverse-direction and a second-shoulder-width shorter than the second-shoulder-length and extending in the longitudinal-direction, the second internal volume formed within the second-leg portion and the second-shoulder portion; and
a first outlet neck extending from the first chamber and in fluid communication therewith, and a second outlet neck extending in the same direction as the first outlet neck from the second chamber and in fluid communication therewith,
wherein a cross-section of the resonator device along the longitudinal-direction includes a section of the first-shoulder-portion and a section of the second-leg-portion,
wherein the first and the second chambers are positioned laterally offset from one another and a space is provided between the first and the second chambers.

13. The resonator device of claim 12, further comprising:
a common floor to support the first and second chambers, wherein the common floor and at least one of the first and second chambers each include a moldable polymer.

14. The resonator device of claim 6, further comprising:
a common floor to support the first and second chambers.

15. The resonator device of claim 14, wherein the common floor and at least one of the first and second chambers each include a moldable polymer.

16. The resonator device of claim 6, wherein the first-leg-width extending in the transverse-direction is at an angle of 85 to 95 degrees to a first-leg-length direction.

17. The resonator device of claim 6, wherein the first and second internal volumes are different.

* * * * *